US012528325B2

(12) United States Patent
Beddis et al.

(10) Patent No.: US 12,528,325 B2
(45) Date of Patent: Jan. 20, 2026

(54) CONTROL SYSTEM FOR A VEHICLE

(71) Applicant: JAGUAR LAND ROVER LIMITED, Warwickshire (GB)

(72) Inventors: Kieran William Beddis, Coventry (GB); Adrian Bouaru, Coventry (GB); William Burdock, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 724 days.

(21) Appl. No.: 17/282,180

(22) PCT Filed: Sep. 30, 2019

(86) PCT No.: PCT/EP2019/076419
§ 371 (c)(1),
(2) Date: Apr. 1, 2021

(87) PCT Pub. No.: WO2020/070055
PCT Pub. Date: Apr. 9, 2020

(65) Prior Publication Data
US 2022/0009303 A1 Jan. 13, 2022

(30) Foreign Application Priority Data
Oct. 2, 2018 (GB) .................................... 1816051

(51) Int. Cl.
*B60G 17/00* (2006.01)
*B60G 17/015* (2006.01)
(Continued)

(52) U.S. Cl.
CPC ..... *B60G 17/0157* (2013.01); *B60G 17/0165* (2013.01); *B60G 21/0553* (2013.01);
(Continued)

(58) Field of Classification Search
CPC ............ B60G 17/0157; B60G 17/0165; B60G 21/0553; B60G 2202/42; B60G 2300/07;
(Continued)

(56) References Cited

U.S. PATENT DOCUMENTS 5,570,288 A * 10/1996 Badenoch ............. B60T 8/3285
701/37
7,561,951 B2 * 7/2009 Rao ..................... B60W 50/035
340/438
(Continued)

FOREIGN PATENT DOCUMENTS

| CN | 101848819 A | 9/2010 |
| CN | 108463363 A | 8/2018 |

(Continued)

OTHER PUBLICATIONS

Combined Search and Examination Report under Sections 17 and 18(3) for Application No. GB1816051.5 dated Mar. 20, 2019.
International Search Report and Written Opinion of the International Searching Authority for International application No. PCT/EP2019/076419 dated Feb. 3, 2020.
(Continued)

*Primary Examiner* — Bao T Nguyen
*Assistant Examiner* — Tien Minh Le
(74) *Attorney, Agent, or Firm* — Carlson, Gaskey & Olds, P.C.

(57) ABSTRACT

Aspects of the present invention relate to a control system, a suspension system, a vehicle and a method. A control system comprising one or more controllers is configured to: receive at least one vehicle dynamics signal, wherein the at least one vehicle dynamics signal is indicative of a vehicle dynamics parameter, determine a current dynamic usage of a vehicle in dependence on the received at least one vehicle dynamics signal, determine a control parameter for an actuator of the vehicle in dependence at least in part on the
(Continued)

current dynamic usage of the vehicle, and output a control signal to control the actuator in dependence on the control parameter.

13 Claims, 10 Drawing Sheets

(51) Int. Cl.
*B60G 17/0165* (2006.01)
*B60G 21/055* (2006.01)

(52) U.S. Cl.
CPC ...... *B60G 2202/42* (2013.01); *B60G 2300/07* (2013.01); *B60G 2400/821* (2013.01); *B60G 2800/9122* (2013.01)

(58) Field of Classification Search
CPC ...... B60G 2400/821; B60G 2800/9122; B60G 17/0162; B60G 2400/102; B60G 2400/104; B60G 2400/204; B60G 2400/8422; B60G 21/0555; B60G 17/018; B60G 2202/442; B60G 2400/252; B60G 2400/71; B60G 2400/98; B60G 2401/904; B60G 2600/07; B60G 2600/21; B60G 2800/012; B60G 17/002; B60G 17/015; B60G 21/055; B60W 10/22
See application file for complete search history.

(56) References Cited

U.S. PATENT DOCUMENTS

| | | | |
|---|---|---|---|
| 8,075,002 B1* | 12/2011 | Pionke | B60G 17/04 280/5.514 |
| 2003/0010559 A1* | 1/2003 | Suzuki | B60K 23/08 180/233 |
| 2007/0017727 A1* | 1/2007 | Messih | B60W 40/13 180/282 |
| 2009/0121444 A1* | 5/2009 | Bushko | B60G 17/0165 280/5.507 |
| 2011/0068552 A1* | 3/2011 | Ryan | B60G 11/006 29/428 |
| 2014/0288776 A1 | 9/2014 | Anderson et al. | |
| 2019/0359025 A1* | 11/2019 | Wager | B60G 21/005 |

FOREIGN PATENT DOCUMENTS

| | | | |
|---|---|---|---|
| EP | 1557304 A1 * | 7/2005 | ......... B60G 17/0152 |
| EP | 3225438 A1 | 10/2017 | |
| FR | 2894878 A1 | 6/2007 | |
| GB | 2523184 A | 8/2015 | |
| WO | 2015/153811 A1 | 10/2015 | |

OTHER PUBLICATIONS

Notice of First Examination Opinion for Chinese Application No. 201980072094.4 dated Apr. 24, 2023.

* cited by examiner

| Anti-roll torque index / Disturbance speed index | 1 | 2 | 3 | 4 | 5 | 6 | 7 | 8 | 9 | 10 |
|---|---|---|---|---|---|---|---|---|---|---|
| 1 | A | A | B | D | D | H | H | H | H | H |
| 2 | A | A | B | D | D | H | H | H | H | H |
| 3 | B | B | B | D | D | H | H | H | I | I |
| 4 | C | C | C | D | D | H | H | I | I | I |
| 5 | C | C | C | C | D | D | I | I | I | I |
| 6 | E | E | E | E | I | I | I | I | I | I |
| 7 | E | E | E | I | I | I | I | I | I | I |
| 8 | F | F | I | I | I | I | I | I | I | I |
| 9 | F | F | I | I | I | I | I | I | I | I |
| 10 | G | G | I | I | I | I | I | I | I | I |

A - Normal on road
B - Degraded on road
C - Non-metallised graded road
D - Enthusiastic on road
E - Belgian pave
F - Fast off road
G - Extreme fast off road
H - Racetrack
I - Abuse use

FIG. 7

| Anti-roll torque index<br>Disturbance speed index | 1 | 2 | 3 | 4 | 5 | 6 | 7 | 8 | 9 | 10 |
|---|---|---|---|---|---|---|---|---|---|---|
| 1 | 80% | 80% | 80% | 80% | 80% | 80% | 80% | 100% | 100% | 100% |
| 2 | 80% | 80% | 80% | 80% | 80% | 80% | 80% | 80% | 100% | 100% |
| 3 | 75% | 75% | 75% | 75% | 80% | 80% | 80% | 80% | I | I |
| 4 | 75% | 75% | 75% | 75% | 80% | 80% | 80% | I | I | I |
| 5 | 60% | 60% | 70% | 70% | 75% | 75% | I | I | I | I |
| 6 | 60% | 60% | 70% | 70% | I | I | I | I | I | I |
| 7 | 55% | 55% | 60% | I | I | I | I | I | I | I |
| 8 | 55% | 55% | I | I | I | I | I | I | I | I |
| 9 | 40% | 40% | I | I | I | I | I | I | I | I |
| 10 | 40% | 40% | I | I | I | I | I | I | I | I |

% of maximum motor speed

FIG. 8

CONTROL SYSTEM FOR A VEHICLE

TECHNICAL FIELD

The present disclosure relates to a control system for a vehicle and particularly but not exclusively a control system associated with a suspension system of a vehicle, or an actuator of the suspension system. Aspects of the invention relate to a control system for a vehicle, a vehicle suspension system, vehicle, and a method of controlling a vehicle system.

BACKGROUND

Some vehicles are able to be used in a variety of use cases, such as generalised driving scenarios. These use cases may make differing demands of the vehicle, its suspension system and its components. A compromise is therefore required in the configuration of the suspension system such that the suspension system can balance various requirements, such as delivering adequate performance without adversely impacting its durability.

Some suspension systems comprise an active element, for example active roll control systems which are operable to respond in a dynamic manner to inputs generated by vehicle motion and the driven terrain. Whilst operable to improve performance over a non-active suspension system, the increased complexity of active suspension systems may make them more susceptible to reduced durability in a high-demand use cases.

It is an aim of the present invention to address at least the aforementioned problems.

SUMMARY OF THE INVENTION

Aspects and embodiments of the invention provide a control system, a suspension system, a vehicle and a method as claimed in the appended claims.

According to an aspect of the present invention there is provided a control system for a vehicle, the control system comprising one or more controllers, the control system configured to: receive a vehicle dynamics signal, wherein the vehicle dynamics signal is indicative of a vehicle dynamics parameter, determine a current dynamic usage of the vehicle in dependence on the received vehicle dynamics signal, determine a control parameter for an actuator of the vehicle in dependence at least in part on the current dynamic usage of the vehicle, and output a control signal to control the actuator in dependence on the control parameter.

This provides the advantage that the vehicle may be controlled more effectively in dependence on the vehicle's current operating conditions. This allows for improved performance of the actuator across a plurality of use cases.

A use case may be understood to be a current driving scenario of the vehicle. Such a use case or driving scenario may comprise how the vehicle is being driven, and what the environment is that the vehicle is currently being driven in. The main component of the environment that defines the use case may be the type of terrain that the vehicle is traversing.

According to an aspect of the present invention there is provided a control system for a vehicle suspension system, the control system comprising one or more controllers, the control system configured to: receive at least one vehicle dynamics signal, wherein the vehicle dynamics signal is indicative of the at least one vehicle dynamics parameter, determine a current dynamic usage of the vehicle in dependence on the received at least one vehicle dynamics signal, determine an operating limit control parameter of an actuator of the vehicle suspension system in dependence at least in part on the current dynamic usage of the vehicle, and output a control signal to control the actuator in dependence on the operating limit.

In an embodiment of the invention the one or more controllers may comprise: an electrical input configured to receive the at least one vehicle dynamics signal, a memory device having instructions stored thereon for determining the control parameter, a processor configured to access the memory device and execute the instructions stored thereon, and, an electrical output configured to output the control signal.

The actuator may be an actuator associated with a suspension system of the vehicle.

The actuator may be an actuator associated with an active roll control system. The active roll control system may form a part of the suspension system.

Advantageously the actuator of the active roll control system can be controlled to provide improved ride and handling characteristics for the vehicle for various use cases The at least one vehicle dynamics signal is received from a component associated with the vehicle suspension system.

Optionally, the at least one vehicle dynamics signal may comprise a disturbance signal indicative of a movement of one or more components of the vehicle suspension system. The disturbance signal may provide data indicating a frequency of movement, a speed of movement, a disturbance acceleration or a combination of the above.

Optionally, the at least one vehicle dynamics signal may be indicative of an anti-roll torque demand or a body roll torque. The body roll torque is the roll in a vehicle body resulting from vehicle motion. The anti-roll torque demand is the torque demanded to counter the body roll torque. The anti-roll torque is optionally determined in dependence on the body roll torque.

The control system may be configured to determine an anti-roll torque demand in dependence on the at least one vehicle dynamics signal, and may determine the current dynamic usage of the vehicle at least in part in dependence on the anti-roll torque demand.

The control system may be configured to, determine a disturbance characteristic value in dependence on the at least one vehicle dynamics signal, and may determine the current dynamic usage of the vehicle at least in part in dependence on the disturbance characteristic value.

The control system may use vehicle dynamics parameters, wherein the at least one vehicle dynamics parameter may comprise at least one of: an anti-roll torque demand, and a disturbance characteristic value.

There may be two or more vehicle dynamics signals. The vehicle dynamics signal may include a disturbance signal and a vehicle dynamics signal indicative of an anti-roll torque demand.

The control system may determine the current dynamic usage of the vehicle which may comprise determining an anti-roll torque demand in dependence on a body roll torque.

The use of an anti-roll torque demand and/or a disturbance signal advantageously allows for the re-use of data already provided to the control system for generic control rather than specific to use case determination.

Determining the current dynamic usage of the vehicle may comprise selecting one of a plurality of predetermined dynamic use cases.

The use cases may correspond to terrain types and vehicle speed and motion over those terrain types.

In an embodiment of the invention the determining the current dynamic usage of the vehicle may comprise determining at least one vehicle usage index, and comparing the at least one vehicle usage index to a plurality of previously determined vehicle usage indices.

Optionally, determining the at least one vehicle usage index comprises determining an average anti-roll torque demand of anti-roll torque demands received over a duration.

Optionally, the determining the average anti-roll torque demand comprises determining a floating root mean square value of the anti-roll torque demands received over a duration.

Determining the at least one vehicle usage index may also, or instead, comprise determining an average movement value of a movement of one or more components of the vehicle suspension system over a duration Optionally, determining the average movement value comprises determining a floating root mean square value of the movement of the one or more components of the vehicle suspension system over the duration.

In an embodiment of the invention the control parameter may comprise at least one of: a disturbance characteristic, a maximum motor speed, a maximum consumption current, a motor torque, and a maximum regeneration current.

The disturbance characteristic may be a disturbance speed and/or a disturbance acceleration.

In an embodiment of the invention determining the control parameter may comprise: determining at least one scaling factor and applying the at least one scaling factor to a default control parameter of the actuator.

The at least one scaling factor may comprise a use case scaling factor, determined in dependence on the vehicle dynamics parameter.

The at least one scaling factor may comprise a de-rate scaling factor, determined in dependence on a temperature of the actuator, as well as or instead of the use case scaling factor.

In an embodiment of the invention determining current dynamic usage may comprise an on-road use case or an off-road use case and wherein the determined operating limit may be higher for the on-road use case than for the off-road use case.

In an embodiment of the invention the control system pre-determined use cases may comprise an off-road use case and the control system may be configured to control the actuator such that the durability of the suspension system may be prioritised in the off-road use case.

In an embodiment of the present invention the control system pre-determined use cases may comprise an on-road use case and the control system may be configured to control the actuator such that the performance of the suspension system in the on-road use case may be prioritised.

According to a further aspect of the present invention there is provided a vehicle suspension system comprising an actuator and the control system according to the preceding aspect.

The actuator may be associated with a suspension system of the vehicle.

The actuator may be associated with an active roll control system. The active roll control system may form a part of the suspension system.

The actuator may be a rotary actuator.

According to a further aspect of the present invention there is provided a vehicle comprising the control system or the vehicle suspension system according to the preceding aspects.

According to a further aspect of the present invention there is provided a method of controlling a vehicle suspension system, the method comprising the steps of: determining a control parameter for an actuator of the vehicle in dependence at least in part on a vehicle dynamics parameter, wherein the vehicle dynamics parameter is indicative of a current dynamic usage of the vehicle, and controlling the actuator in dependence on the control parameter.

According to a further aspect of the present invention there is provided a non-transitory computer readable medium comprising computer readable instructions that, when executed by a processor, cause performance of the method of the preceding aspect.

According to a further aspect of the invention there is provided a suspension control system, the control system configured to: receive a signal indicative of an ambient temperature, and control an operation of a component in dependence on the signal indicative of an ambient temperature.

According to a further aspect of the invention there is provided a control system for a vehicle suspension system, the control system comprising one or more controllers, the control system configured to: receive a vehicle dynamics signal indicative of a dynamic parameter of a suspension component of a vehicle, and determine a current vehicle use case in dependence on the vehicle dynamics signal.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

According to an aspect of the present invention there is provided a control system for a vehicle suspension system, the control system comprising one or more controllers, the control system configured to: receive at least one vehicle dynamics signal, wherein the at least one vehicle dynamics signal may be indicative of at least one vehicle dynamics parameter, wherein the at least one vehicle dynamics parameter may comprise at least one of: an anti-roll torque demand, and a disturbance characteristic value; determine a current dynamic usage of a vehicle in dependence on the received at least one vehicle dynamics signal; determine an operating limit for a control parameter of an actuator of the vehicle suspension system in dependence at least in part on the current dynamic usage of the vehicle, wherein the control parameter comprises at least one of: a disturbance characteristic, a motor speed, a consumption current, a motor torque and a regeneration current; and output a control signal to control the actuator in dependence on the operating limit.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 7 shows a data structure for use in an embodiment of the invention;

FIG. 8 shows a further data structure for use in an embodiment of the invention;

DETAILED DESCRIPTION

A control system for a vehicle in accordance with an embodiment of the present invention is described herein with reference to the accompanying figures.

Figure 1:
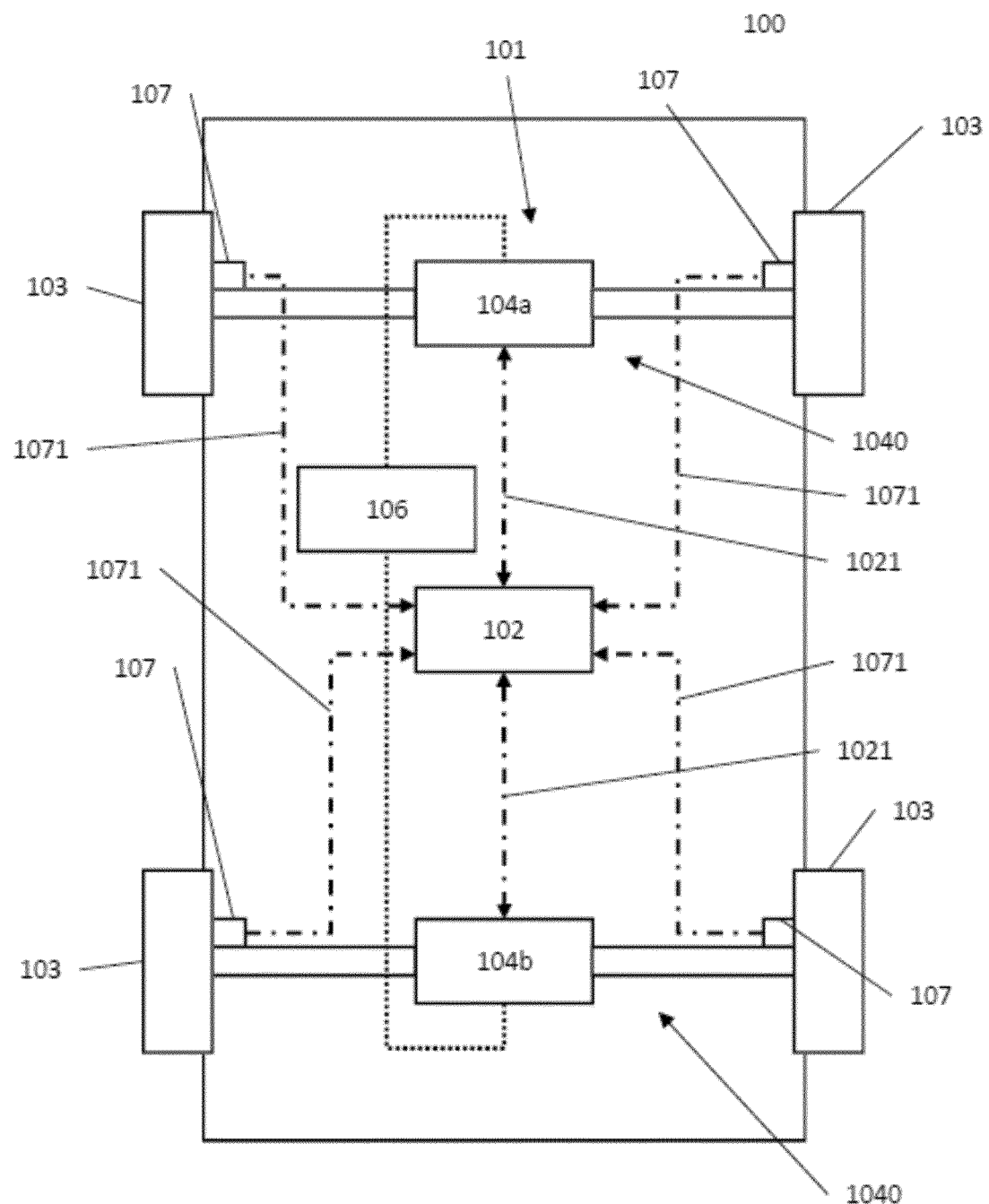
FIG. 1 shows a simplified schematic, plan view of a vehicle having a suspension system.

With reference to FIG. 1, a vehicle 100 is provided having a plurality of wheels 103. The vehicle further comprises a suspension system 101 i.e. a vehicle suspension system 101. The suspension system 101 is operable to separate disturbances from an unsprung mass of the vehicle from a sprung mass of the vehicle. The unsprung mass comprises at least the wheels 103 and the sprung mass at least the vehicle body (not shown). The suspension system 101 is configured to provide a preferred compromise between at least some of the vehicle's road handling characteristics, otherwise known as handling, and ride quality, otherwise known as ride. Ride and handling are predominantly opposed to one another and as such tuning the suspension system to meet the requirements of both requires some form of compromise. The performance of the suspension system 101 may be characterised by the ride and handling characteristics it provides for the vehicle 100, and how effectively it manages the compromise between these competing characteristics. The durability of the suspension system 101 is also affected by inputs into the system 101 and the system's response to said inputs in delivering the ride and handling requirements. The larger and more sustained an input, or the system's response to said input, is the greater the impact on the durability of the system 101.

The suspension system 101 shown in FIG. 1 is an active suspension system. An active suspension system advantageously 101 provides greater opportunities to reduce the compromises between ride and handling than a non-active suspension system. An active suspension system is adaptable in response to measured inputs. The compromises between ride and handling are reduced through the use of actuators 104 controlled by a control system 102 of the active suspension system.

Whilst examples of the invention are described in relation to a wheeled vehicle 100, the invention is also applicable to vehicles 100 comprising other ground engaging apparatuses, for example tracks or skis. It will also be appreciated that the vehicle 100 may comprise a mix or combination of types of ground engaging apparatuses.

A characteristic that effects ride and handling is body roll of the vehicle 100. Body roll can be caused by one or a combination of several factors, these may include high lateral accelerations, often caused by cornering at high speeds. Body roll can be defined by a roll torque, i.e. a body roll torque, which is an amount of torque about a longitudinal axis of the vehicle 100, i.e. a roll axis. Examples of the invention include systems operable to provide an anti-roll torque. An anti-roll torque can be defined as a torque which is applied in a counter direction to the roll torque. The anti-roll torque is therefore applied to mitigate or reduce the effects of the roll torque.

Another characteristic that effects ride and handling is wheel disturbance. A main cause of wheel disturbance is as a response of the wheel 103 to the terrain over which the vehicle 100 is currently travelling. A magnitude of the wheel disturbance is dependent on the terrain. A speed and a frequency of the wheel disturbance is dependent on the terrain and the vehicle speed at which the vehicle 100 is currently travelling over the terrain. The wheel disturbance is transmitted to other components of the suspension system 101 and as such measurements indicative of disturbance may be taken from various point within the system 101.

The suspension system 101 comprises an electronic anti-roll control system 1040, 104. The electronic anti-roll control system 1040, 104 is operable to reduce an amount of roll in the vehicle. The electronic anti-roll control system 1040, 104 comprises one or more active roll stabilisers 1040a, 1040b. The one or more active roll stabilisers 1040a, 1040b each comprise an actuator 104a, 104b. The one or more active roll stabilisers 1040a, 1040b are used in place of passive stabilisers, which comprise anti-roll bars without any actuation. The actuators 104a, 104b are controlled by a control system 102. The control system 102 may control the actuators 104a, 104b independently in order to improve the vehicle's ride and handling characteristics. The control system 102 controls the actuators 104a, 104b to apply an anti-roll torque to counter a roll torque in the vehicle. The control system 102 may control the actuator in dependence on a determined anti-roll torque demand. A control signal 1021 is output from the control system 102 and received by the actuator 104*a*, 104*b*. The control signal 1021 carries control instructions to be performed by the actuator 104*a*, 104*b*. The one or more active roll stabilisers 1040*a*, 1040*b* comprises a front active roll stabiliser 1040*a* associated with a front axle of the vehicle. The one or more active roll stabilisers 1040*a*, 1040*b* comprises a rear active roll stabiliser 1040*a* associated with a rear axle of the vehicle. Some vehicles may be fitted with a rear active roll stabiliser 1040*b* only.

The suspension system 101 may comprise different forms of an active suspension system, as well as or instead of the anti-roll control system comprising active roll stabilisers 1040*a*, 1040*b* as described above. Other forms of active suspension system 101 also comprise actuators 104*a*, 104*b* that may be susceptible to overheating and thus a control system or method as described herein may be applied likewise. The actuators 104*a*, 104*b* may be fully active actuators capable of delivering both damping and static forces. The static forces may be determined in dependence on the measured lateral acceleration and velocity of the vehicle as well as a pre-determined vehicle weight. Each actuator may form part of an active damper associated with an active suspension system. An active suspension system 101 comprising active dampers will have an active damper at each wheel 103 of the vehicle 100 in which the active suspension system 101 is fitted.

The control system receives input signals 1071 from a plurality of sensors 107. The plurality of sensors 107 comprise one or more sensors 107 associated with the suspension system 101. At least some of the sensors 107 may be associated with further systems of the vehicle (not shown). The sensors 107 are arranged to measure respective variables associated with the vehicle 100 and its operation. The actuators 104*a*, 104*b* draw electrical power from a system power supply 106. The system power supply 106 may be a dedicated power supply for the suspension system 101. The system power supply 106 may be a 48V power supply. The system power supply 106 may comprise a super capacitor, wherein the super capacitor may draw its power from a vehicle power supply. In examples where the vehicle power supply is not the same voltage as the system power supply 106, such as a 12V power supply, a DC-DC converter may be used. Other power supplies 106 may be used in dependence on the type of vehicle 100 the system 101 is a part of. For example in non-hybrid vehicles a 12V supply may be used.

Figure 2:
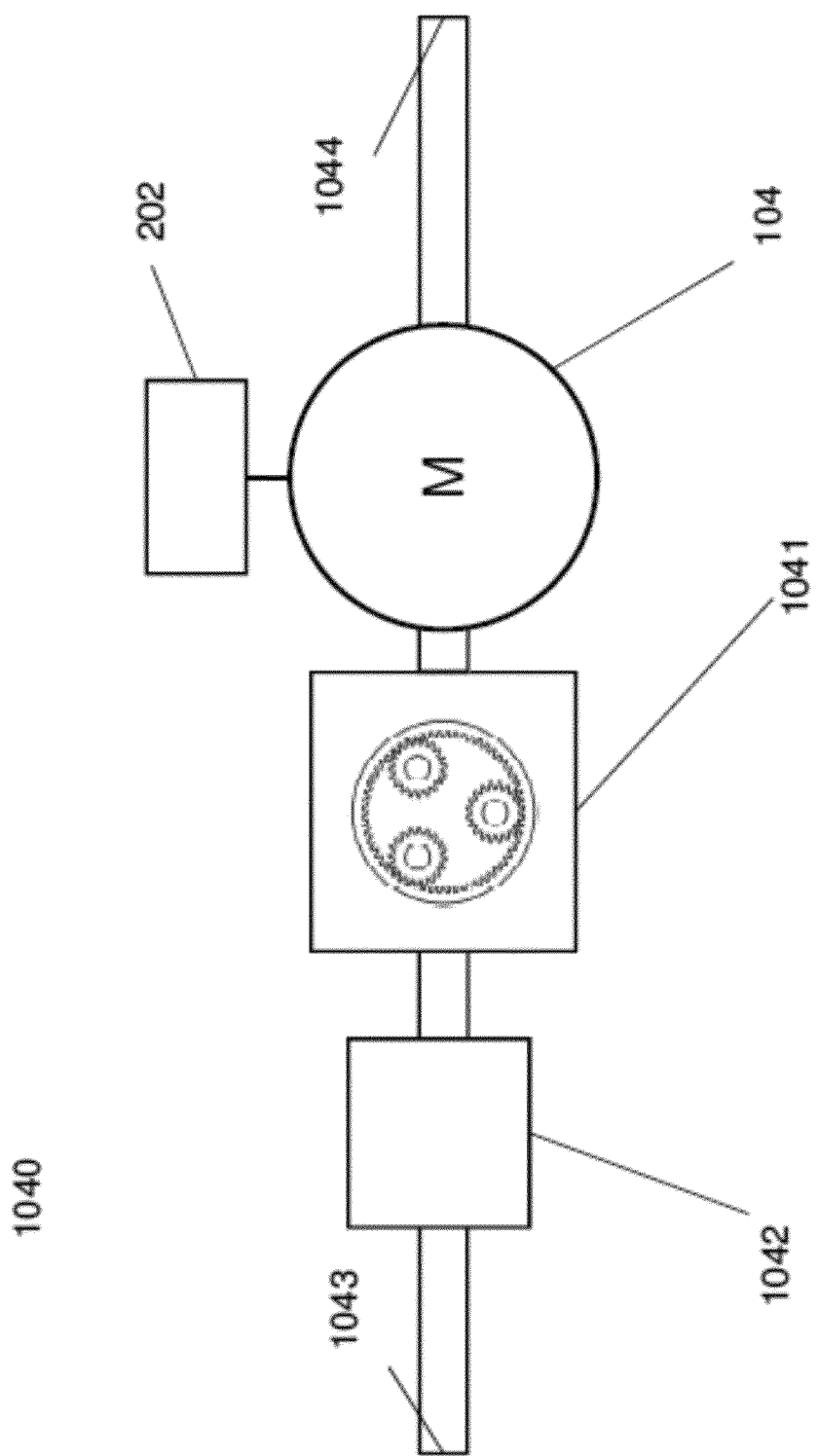
FIG. 2 shows a simplified schematic of an active roll stabiliser.

An example of an active roll stabiliser 1040 is shown in FIG. 2, which is a module forming part of the suspension system 101 and comprises the actuator 104. FIG. 2 is simplified and shows the major components associated with the roll stabiliser 1040. The active roll stabiliser 1040 comprises the actuator 104, a controller 1022, a gearbox 1041 and an isolating unit 1042. The actuator 104 is an electric motor, which is controlled by the controller 1022 such that a first side 1043 of the active roll stabiliser 1040 is rotated in relation to a second side 1044 of the active roll stabiliser 1040, thereby generating a torque. The generated torque provides the anti-roll torque to counteract the roll torque in the vehicle body.

The actuator 104 has a plurality of control parameters which determine the actuator's performance. Control parameters may include one or more of: motor speed, motor torque, consumption current, regeneration current, disturbance speed and disturbance acceleration. In particular the control parameters may be characterised by the maximum values the actuator is operable to be controlled to. For example: A maximum value for the consumption current and regeneration current may be less than 50 A, more specifically the maximum value for the consumption current and regeneration current may be approximately 40 A; A maximum motor speed may be less than 500 rad/s, more specifically the maximum motor speed may be in the region of 400 to 450 rad/s, the maximum motor speed may be approximately 420 rad/s. It will be appreciated that other values may be used.

The actuator 104 is configured to provide torque up to a maximum torque. Different maximum torques may be applicable dependent on the actuator specification, which may be determined in dependence on the type and size of the vehicle 100. For example an SUV type vehicle may have a larger actuator 104 than a compact type vehicle. In some examples the maximum torque may be between 900 Nm and 2000 Nm. In some examples the maximum torque may be approximately 1400 Nm.

Figure 3:
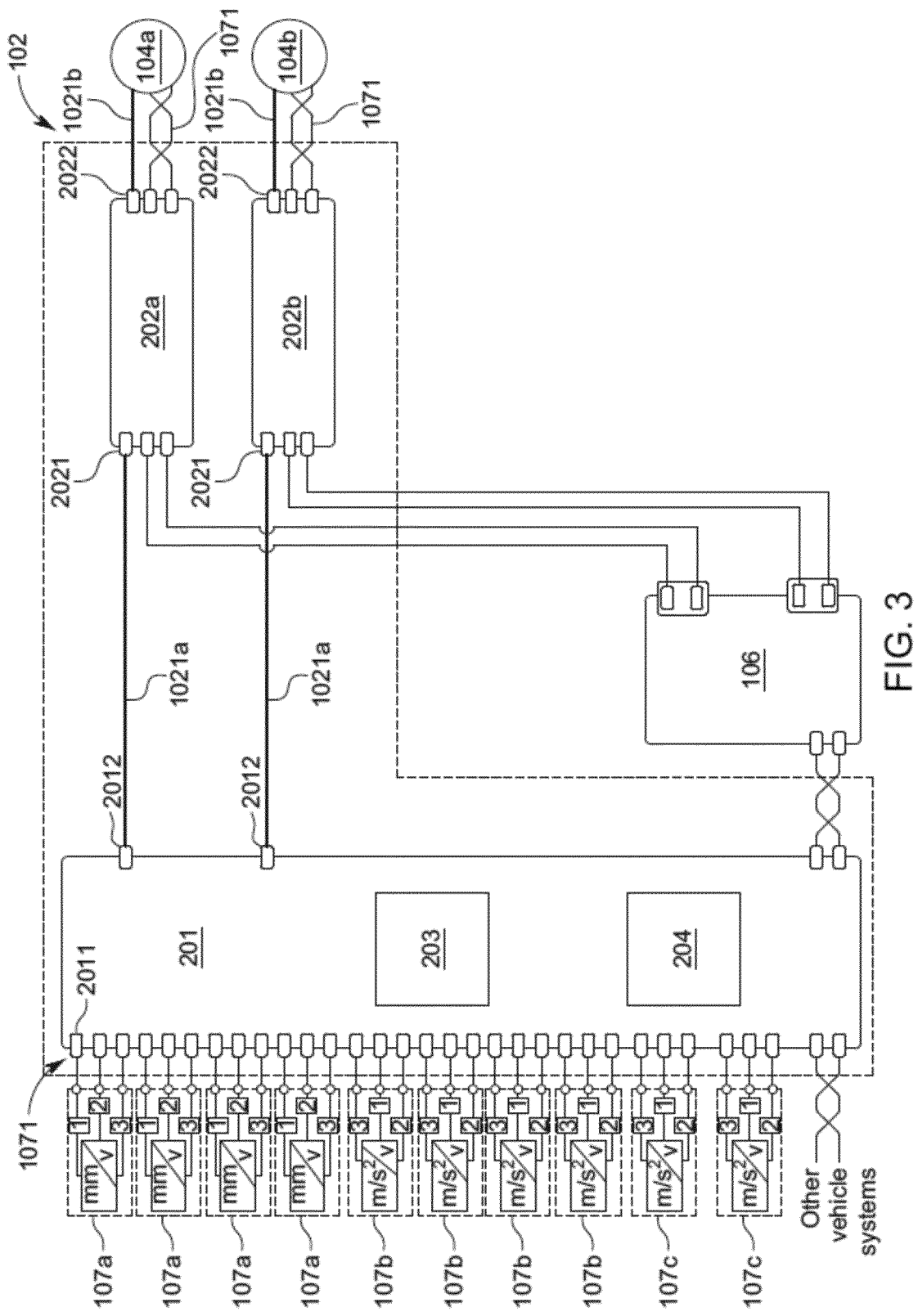
FIG. 3 shows a simplified schematic of a control system for use in the vehicle of FIG. 1.
Figure 4A:
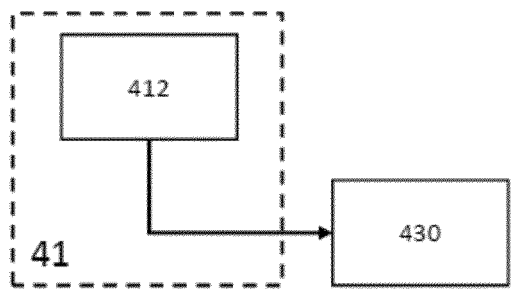
FIG. 4a shows a block diagram according to an embodiment of the invention.
Figure 4B:
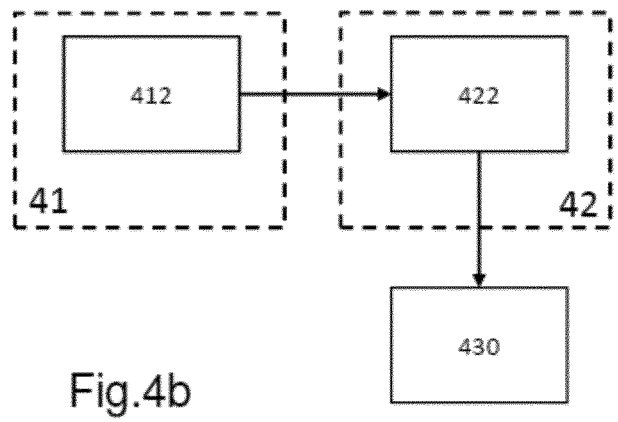
FIG. 4b shows a further block diagram according to an embodiment of the invention.
Figure 4C:
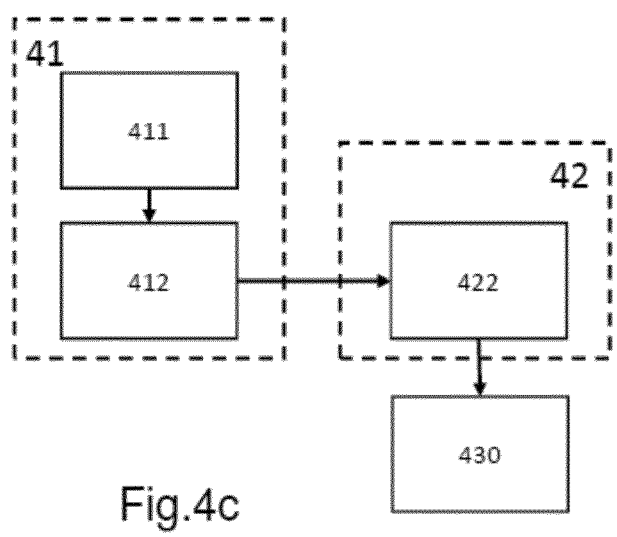
FIG. 4c shows a further block diagram according to an embodiment of the invention.
Figure 4D:
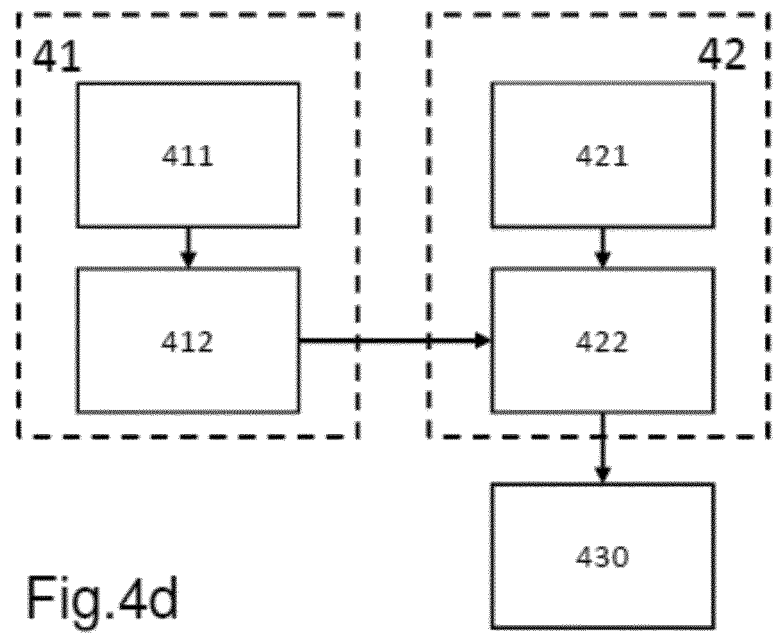
FIG. 4d shows a further block diagram according to an embodiment of the invention.
Figure 4E:
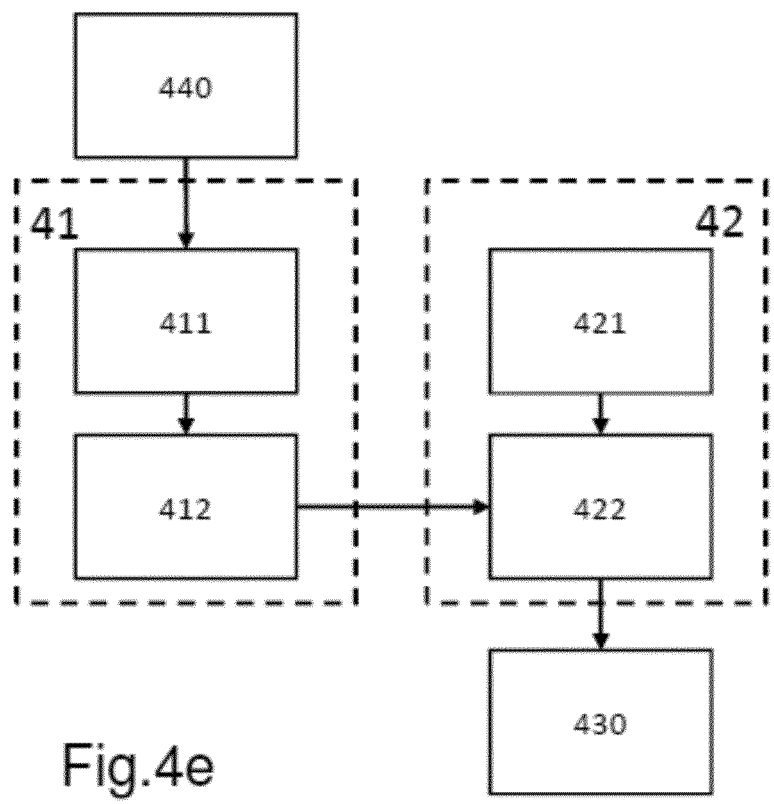
FIG. 4e shows a further block diagram according to an embodiment of the invention.

FIG. 3 provides a system diagram for the control system 102 used in the vehicle 100 shown in FIG. 1. The control system 102 is coupled to the plurality of sensors 107, specifically 107*a*-107*c*, and the actuators 104 of the respective front and rear active roll stabilisers 1040. The control system 102 comprises at least one controller 201, and may comprise a plurality of controllers. In this example the control system 102 encompasses a main controller 201 and two actuator controllers 1022. The main controller 201 comprises a memory 203 and a processor 204. The processor 204 is configured to access the memory 203 to execute computer-readable instructions stored therein. The memory 203 may also store information and parameters relating to the control system 101.

In some examples the control system 102 comprises a main controller 201 and a plurality of actuator controllers 202*a*, 202*b*. In the illustrated example the control system 102 comprises first and second actuator controllers 202*a*, 202*b* each associated with a respective actuator 104*a*, 104*b*. In other examples the control system 102 may comprise a single controller or a greater plurality of controllers. The control system 102 is configured to output a control signal 1021 to the actuator(s) 104*a*, 104*b*. In some examples a first part of a control signal 1021*a* is sent from an electrical output 2012 from the main controller 201 and is received at an electrical input 2021 of the actuator controller 202. The first part of the control signal 1021*a* is then further processed in each actuator controller 202*a*, 202*b* and a second part of the control signal 1021*b* is then output from an electrical output 2022 of each actuator controller 202*a*, 202*b* to the respective actuator 104*a*, 104*b*.

The input signals 1071 comprise one or more vehicle dynamics signals which are indicative of various vehicle dynamics parameters. In other words, at least some of the input signals 1071 are associated with parameters associated with a motion of the vehicle. This may non-exhaustively include displacements, velocities and accelerations of the vehicle 100, its systems and individual components. In an example the sensors 107 comprise at least one of: a suspension height sensor 107*a*, an accelerometer 107*b* at the wheel 103 and a lateral acceleration sensor 107*c*. There may be multiple of the aforementioned sensors 107. There may be for example height sensors 107*a* and/or accelerometers 107*b* at each of the four corners of the vehicle 100. There may be two lateral sensors 107*c*. A first lateral acceleration sensor may be positioned low in the vehicle 100 and a second lateral acceleration positioned higher in the vehicle 100. Alternatively acceleration may be measured from a single unit associated with the vehicle, such as an inertial measurement unit (IMU). The vehicle dynamic parameters are indicative of a current dynamic usage of the vehicle. Dynamic usage is characterised by the effect the usage has on the motion of the vehicle 100. The motion of the vehicle 100 may be defined using at least one of six axes: longitudinal, lateral, vertical, yaw, roll and pitch. Preferably all six axes of motion are used. The one or more actuators 104a, 104b in communication with the control system 102 also provide vehicle dynamics signals 1071. These signals may be indicative of a movement or disturbance of the actuators 104a, 104b or the active roll stabiliser 1040 and/or its constituent components. The vehicle dynamics signal may comprise the disturbance signal 1071a.

The amount of power drawn from the power supply system 106 is dependent on the anti-roll torque demand and a disturbance control demand.

The anti-roll torque demand may be determined using equations of motion. For example a measured lateral acceleration at a point in the vehicle and the vehicle's mass can be used to calculate a lateral force. The distance from the point at which the lateral acceleration is measured to the roll axis of the vehicle 100 can then be used along with the lateral force to calculate a roll torque. A data structure such as a roll map provides values of roll torque corresponding to measured lateral accelerations. The data structure is stored in a memory 203 accessible to the control system 102. The map may be determined in dependence on a plurality of vehicle properties. The vehicle properties may include geometry and kinematics of the vehicle 100 and/or the suspension system 101, spring rates of one or more of the suspension system components and vehicle mass. The control system 102 calculates the anti-roll torque to be provided by the actuator 104 in order to meet the roll torque determined from the roll map.

The frequencies of the changes in lateral acceleration that affect the anti-roll torque demand are often less than 3 Hz. More specifically the majority of the lateral acceleration frequencies are often less than 2 Hz. Predominantly the lateral acceleration frequencies are in the region of generally around 1 Hz.

The disturbance control demand is determined in dependence on inputs at the wheel 103. Inputs at the wheel 103, i.e. wheel disturbances, are generated in dependence on a roughness of a driven surface. The roughness of the driven surface may be defined as the profile of the driven surface. More specifically, the roughness of the driven surface may be defined by an amplitude and/or a frequency of surface variation of the driven surface. The disturbances are dependent on the vehicle's speed. In particular the disturbances are dependent on the vehicle speed and the roughness of the driven surface. The rough surface induces wheel inputs which are translated to the active roll stabiliser 1040. In order to mitigate or reduce unwanted torque generation the actuator 104 is powered and controlled to act against the disturbances.

The disturbance control demand is determined so as to counteract a disturbance characteristic value. The disturbance characteristic value is determined by the control system 102. The disturbance characteristic value may be indicative of a disturbance characteristic of the active roll stabiliser 1040 or one of its constituent components such as the actuator 104. The disturbance characteristic value is determined in dependence on the one or more vehicle dynamics signals 1071. The vehicle dynamics signals 1071 comprise displacement values acceleration values of at least some of the wheels 103. The wheel displacement is proportional to a displacement of the roll stabiliser 1040. The wheel displacement may be used to infer a vertical velocity. The roll stabiliser displacement may be used to infer a rotational velocity. The disturbance characteristic value is determined as a difference between the velocities determined from the first side 1043 and the second side 1044 of the roll stabiliser 1040. The disturbance control demand may be configurable by the control system 102 to cause the actuator 104 to operate up to a maximum operating speed, a maximum operating frequency, a maximum operating acceleration, or a combination of the above so as to counteract the disturbance characteristic value.

The disturbance characteristic may comprise various disturbance characteristics. The disturbance characteristic may comprise a movement of a component of the suspension system 101. More specifically, the disturbance characteristic value may comprise a disturbance speed or a disturbance acceleration of a component of the active roll stabiliser 1040. In examples where the component of the active roll stabiliser 1040 is a motor 104 the disturbance characteristic value may comprise an angular speed or an angular acceleration of the motor 104.

In some examples the disturbance characteristic value may be provided as a vehicle dynamics signal 1071, received form a different controller or system of the vehicle 100.

The disturbance control demand is a feed forward demand, in that the disturbances are determined and accounted for, by the control system 102 independently of the anti-roll torque demand. The control system 102 may apply a scaling factor to the disturbance characteristic value in order to determine the disturbance control demand. The disturbance control demand may therefore be determined to be up to 100% of the disturbance characteristic value. For example, the determined disturbance characteristic may be a disturbance speed. If the disturbance control demand is configured to be 100% of the disturbance characteristic value then a controlled disturbance response speed of the actuator 104 will be equal to the disturbance speed.

The disturbance signal 1071a may comprise frequency information indicative of the frequency of the wheel disturbance. The frequency of the wheel disturbance may be greater than 3 Hz. The wheel disturbance may predominantly be in the region of 12 Hz.

In some example the dynamic usage may be broken down into discrete or overlapping use cases. Such use cases are defined by their effect on vehicle motion. For example driving the vehicle 100 on a race track may be characterised by high lateral accelerations and body roll, produced by cornering at high speeds, but at relatively low frequencies. Driving the vehicle 100 off-road may be characterised by a large number of wheel inputs at relatively high frequencies and terrain induced, low frequency body roll events. For the purposes of wheel inputs, high frequencies may be defined as being greater than 10 Hz. In particular, high frequencies may be approximately 15 Hz. High wheel input frequencies can be caused by the articulation of the vehicle 100 as it passes over uneven terrain. Normal road driving, on metalled roads, will result in low wheel input and moderate lateral accelerations at predominantly low frequencies.

The amount of power required by the actuator 104 is dependent on body roll and disturbances as caused by the wheel inputs generated by the terrain. More specifically the amount of power required by the actuator 104 is dependent on the anti-roll torque demand and the disturbance control demand. In particular the frequency and amplitude of the anti-roll torque and the frequency and amplitude of the response to the wheel inputs. The anti-roll torque demand is dependent on the roll torque. The greater the power usage (or power generation, for situations in which the actuator may act as a generator) by the actuator 104 the more waste heat will be produced by the actuator 104. The actuator 104 has a maximum operating temperature, above which it will overheat. Overheating may degrade the function of the anti-roll control system 101. Some cooling effects can be realised with the actuator's 104 exposure to ambient conditions and air flow. However the actuator's 104 position within the vehicle 100 may mean that this is limited. The control system 102 is therefore configured to control the power consumption of the actuator 104.

In some examples the actuator is de-rated, i.e. has its output limited, in dependence on the actuator temperature reaching a threshold. The threshold being determined in dependence on the actuator's 104 maximum operating temperature. However de-rating solely in dependence on temperature may lead to inconsistent performance for the vehicle user.

In some examples limiting the actuator's operation is limited in dependence on one or more determined high power draw use cases and a detected ambient temperature. The one or more high power draw use case is a use case in which the power demands of the suspension system 101 are determined to be greatest.

De-rating the actuator 104 in high ambient temperatures can reduce the likelihood of the actuator 104, or other components of the suspension system 101, reaching their respective maximum operating temperatures. De-rating the actuator 104 may comprise controlling the actuator 104 such that its power consumption is reduced. De-rating may comprise controlling the actuator 104 such that control parameters affecting its output are reduced. The control system 102 may receive a temperature signal indicative of an ambient temperature. The ambient temperature may be an external ambient temperature, i.e. a temperature of the environment external to the vehicle 100. The ambient temperature may be a local ambient temperature, i.e. a temperature of the environment proximal to one or more of the components of the suspension system 101. The component ambient temperature may therefore be a temperature within a region of the vehicle. The region of the vehicle may be in an underfloor region of the vehicle 100.

A de-rate temperature value is determined in dependence on the measured ambient temperature. The de-rate temperature value is a temperature at which the actuator 104 is de-rated. The determination of the de-rate temperature value is made such that at higher ambient temperatures the de-rate temperature value is lower. The de-rate temperature value is determined by the application of a scaling factor to the maximum operating temperature of the component. For example, at high ambient temperatures the de-rate temperature value may be set at 60% of the maximum operating temperature. In this and other examples, at low ambient temperatures the de-rate temperature value may be set at 80% of the maximum operating temperature. High ambient temperatures may be determined when the temperature of the environment external to the vehicle 100 exceeds 40° C. although other temperature values may be selected. High ambient temperatures may be determined when the temperature of the environment proximal to one or more of the components of the suspension system 101 exceeds 140° C. although other temperature values may be selected. Low ambient temperatures may be determined when the temperature of the environment external to the vehicle 100 is below 20° C. although other temperature values may be selected. Low ambient temperatures may be determined when the temperature of the environment proximal to one or more of the components of the suspension system 101 is below 90° C. although other temperature values may be selected. Further scaling factors may be determined through interpolation and extrapolation of these values. The scaling factors may be embedded within a data structure of the controller's memory 203. The data structure may be in the form of a look-up table, for example.

Alternatively, a prediction of when the component may reach its maximum operating temperature is made by the control system 102 using the high power draw use case and the ambient temperature. If a predicted duration until the actuator reaches its maximum operating temperature falls within a time range the actuator may then be controlled to operate at a reduced performance level such that its maximum operating temperature is not reached.

De-rating the actuator 104 may comprise applying a scaling factor to one or more of the control parameters.

However de-rating in all use cases in which there is a high ambient temperature degrades the functionality of the component in situations where the risk of the maximum operating temperature being reached is low. Thus the full capability of the vehicle 100 and its systems may not be available.

De-rating in all use cases in which there is a high ambient temperature therefore limits the performance of the anti-roll control system in more use cases than is required. For example a vehicle travelling in a hot environment on a metalled road will have its system limited in such a way as to be based on an off-road driving use case. Should a high anti-roll torque demand be made, then the capabilities of the system will be much more limited than if the vehicle had been travelling in a cold environment. However in such a scenario there would be a low risk of the actuator 104 reaching its maximum operating temperature as the predominant anti-roll torques and wheel disturbances would be low.

In some examples the actuator 104 is controlled in dependence on a current dynamic usage of the vehicle 100. This provides the benefit that a vehicle 100 operating in a low power use case (such as driving on a metalled road) is operable to still provide improve ride and handling characteristics even should high power requirement, discrete events should occur. Examples of high power requirement, discrete events include driver inputs, such as aggressive steering, and road conditions, such as a pot hole.

FIGS. 4*a* to 4*e* provide block diagrams depicting the various steps executed by the control system 102. The steps comprise two sets of steps, a use case set 41 and a de-rate set 42. The use case set 41 may be performed within the main controller 201. The de-rate set may be performed within the actuator controller 202.

At block 430 the actuator 104 is controlled in dependence on a determined control parameter as further discussed below.

Within the use case set 41:

At block 412 the control system 102 determines a control parameter for the actuator 104. Control parameters for an actuator 104 are parameters relating to its performance. For example control parameters for an actuator 104 in an anti-roll control system may include at least one of: a disturbance characteristic, a maximum motor speed, a maximum consumption current and a maximum regeneration current. The determination is made in dependence on the at least one vehicle dynamics parameter indicative of a current dynamic usage of the vehicle 100. The parameter(s) are indicated by the vehicle dynamics signal(s) 1071 received by at least one of the controllers 201 of the control system 102.

In some examples determining the control parameter comprises the application of a scaling factor to a predetermined control parameter. The predetermined control parameter may be a default control parameter. The scaling factor being determined in dependence on the at least one vehicle dynamics parameter indicative of a current dynamic usage of the vehicle 100. For example, where the at least one vehicle parameter indicates a high dynamic usage of the vehicle 100 then the scaling factor will be lower than if the indication was of a low dynamic usage. A lower scaling factor results in a lower control parameter. A lowered control parameter is one which demands less power consumption that an un-lowered one. For example a lower maximum consumption current of a motor will cause the motor to use less power than a higher maximum consumption current.

At block 411 a determination is made of a likely current vehicle 100 use case. The at least one vehicle dynamics parameter is used to make this determination. Various vehicle dynamics parameters may be used. In some examples the at least one vehicle dynamics parameter comprises a roll torque or an anti-roll torque, the anti-roll torque determined in dependence on the roll torque. In some examples the at least one vehicle dynamics parameter comprises a movement of one or more components of the suspension system 101 of the vehicle. The movement of one or more components may be defined by a disturbance characteristic. The disturbance characteristic may be a disturbance speed, and/or a disturbance acceleration of the active roll stabiliser 1040, or one of its constituent components.

In some examples, one or more index values are generated at block 411 for the vehicle dynamics parameters. Generating the index values comprises averaging the received values of the vehicle dynamics parameters received over a duration. The index values comprise a torque demand index. Generating a torque demand index comprises determining a floating root mean square value of the anti-roll torque demand at each of the front and rear axles. The index values comprise a disturbance index. Generating a disturbance index comprises determining a floating root mean square value of a velocity difference between a left hand wheel 103 and a right hand wheel 103 at each of the front and rear axles. The generated index values are then used to select an appropriate use case scaling factor at block 412, relevant to a particular predetermined control parameter. The selection of the appropriate use case may be made in dependence on previously carried out characterisation testing. The characterisation testing is used to identify the relationship between the various use case scaling factors and power consumption by use case. In other examples the characterisation testing is used to identify the relationship between the various use case scaling factors and performance of the suspension system 101 by use case. The results of the characterisations may then be provided within the control system 102 as a mapping function. For example the results of the characterisations may be embedded within a data structure of the controller's memory 203. The data structure may be in the form of a look-up table. In other examples other mapping functions may be used. Such mapping functions may include neural networks or other non-linear mapping functions.

At block 440, the anti-roll torque demand is determined. The anti-roll torque demand forms one of the vehicle dynamics parameters. The determination may be made within the main controller 201 or elsewhere within the control system 102. The determination is made in dependence on a measured or determined roll torque. The roll torque may be determined in dependence on the vehicle dynamics signals 1071 received from at least one of the plurality of sensors 107. The anti-roll torque demand may be determined through the use of a data structure. The data structure may be a look-up table. The anti-roll torque demand may be determined through the use of vehicle mass and vehicle kinematic properties input into equations of motion. The roll torque is determined in dependence on a measured lateral acceleration. The roll torque may then be provided to the look-up table and an anti-roll torque selected from therein in dependence on the determined roll torque.

The scaling factors are in a range of predetermined minimum and maximum values such as in the range of 0 to 1. Wherein a scaling factor of 1 means that 100% of the predetermined control parameter is applied. For example a scaling factor between 0.9 and 1 may be used in on-road conditions and in off-road conditions a scaling factor between 0.5 and 0.7 may be used.

In some examples block 411 is performed in a separate vehicle system, such as a terrain determination system. The output from said separate system can then be supplied to block 412 within the control system 102.

Within the de-rate set 42:

At block 422 the control system 102 determines the control parameter for the actuator 104 in dependence on the previously determined control parameter at block 412 and a temperature value. The temperature value may be indicative of a component temperature. The component may be the actuator 104, the actuator controller 1022 or the system power supply 106. The control parameter is determined in dependence on the temperature such that a higher temperature provides for a lower power consumption control parameter to be determined.

Figure 5:
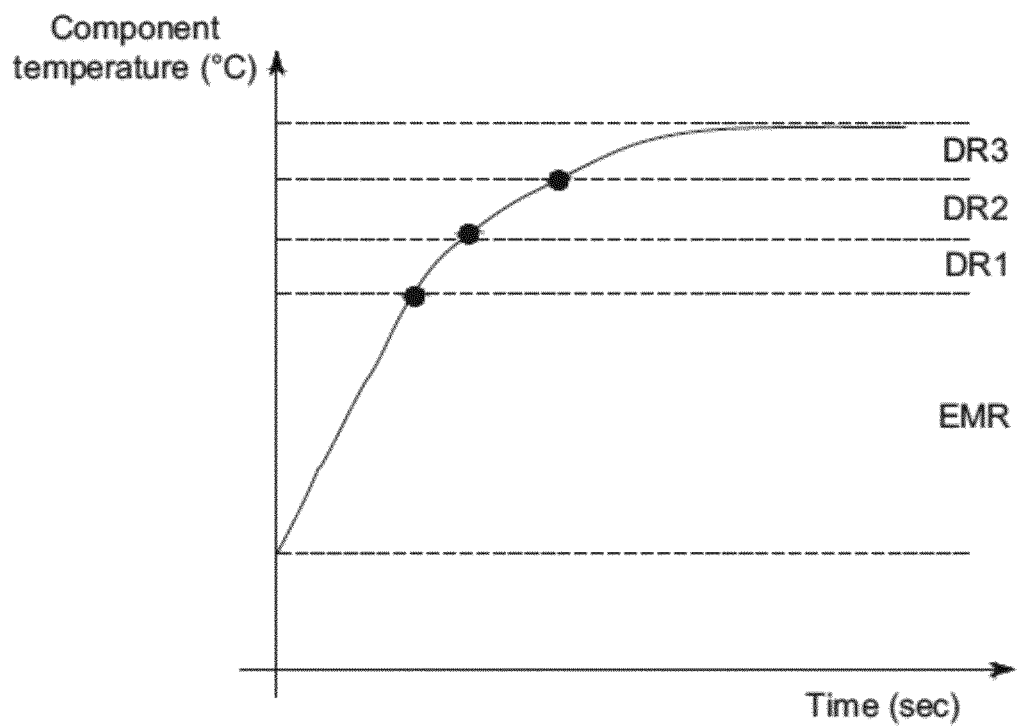
FIG. 5 shows a plot of a component temperature against time.

Block 421 compares the temperature value to a plurality of temperature ranges. The plurality of temperature ranges comprises at least an energy management range EMR and a de-rate range DR. As shown in FIG. 5 the de-rate range DR may be split into a further plurality of de-rate ranges DR1, DR2, DR3. Each temperature range may correspond to a de-rate scaling factor which is a scaling factor of 1 and below. When the system is in the lowest range, the energy management range EMR, the scaling factor is 1. As the temperature increases it falls within de-rate ranges DR the scaling factor is reduced (towards 0).

The temperature ranges may be specific to each component of the suspension system 101. The temperature ranges may be specific to a constituent part of at least one of the components.

For example, for windings of the actuator 104:

The energy management range EMR may comprise low and normal temperatures. Low temperatures may be considered to be temperatures below −40° C. Normal temperatures may be considered to be in the range of −40° C. to 90° C.

The de-rate range may comprise temperatures exceeding 90° C. More specifically a first de-rate range DR1 may comprise temperatures in the range of 90° C. to 140° C., a second de-rate range DR2 may comprise temperatures in the range of 140° C. to 170° C. and a third de-rate range DR3 may comprise temperatures in the range of 170° C. to 180° C. Temperatures exceeding the de-rate range may cause the control system to provide a shut-down signal in order to prevent any further heating.

Block 421 may be carried out for more than one of the components of the suspension system. Specifically it may be carried out for the actuator 104, a further actuator 104, the actuator controller 1022 and the system power supply 106. In other words each component will have its own energy management range EMR and de-rate range DR as shown in FIG. 5. The control system may select the component which has the highest rated range. For example, if the temperature of the actuator 104 is in its energy management range EMR, the temperature of the actuator controller 1022 is in its first de-rate range DR1 and the temperature of the system power supply 106 is in its second de-rate range DR2, the control system will select a scaling factor corresponding to DR2.

Various modifications can be made to the blocks without departing from the scope of the present invention. Determinations may be combined or separated into the various blocks herein defined or into further blocks defining further higher resolution steps.

Figure 6:
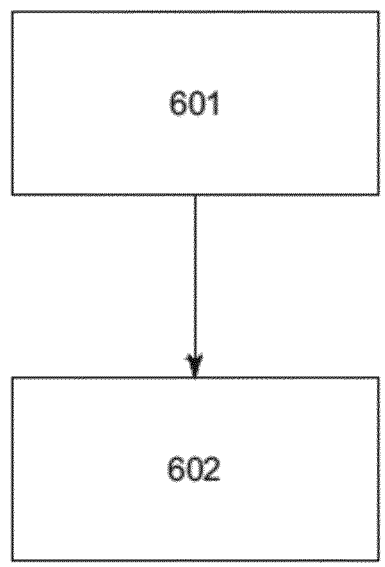
FIG. 6 shows a flow diagram according to an embodiment of the invention.

A method corresponding to the control system 102 previously described is provided in FIG. 6. The method comprises two steps. The first step 601 comprises determining a control parameter for the actuator 104 in dependence at least in part on the vehicle dynamics parameter. The second step 602 comprises controlling the power consumption of the actuator 104 in dependence on the control parameter.

In some examples the determination of the likely current vehicle use case may be used for other purposes instead of, or as well as, energy management. For example the use case, determined at block 411, may be used to determine a control a parameter in order to control the performance of the suspension system 101. The performance of the suspension system 101 may be controlled by the control system 102 such that the response of the suspension system 101 is tuned to provide a preferred response for pre-determined use cases. The pre-determined use cases may be stored in a memory 203 accessible by the control system 102. The performance of the suspension system 101 may be controlled by the control system 102 such that the response of the suspension system 101 is tuned to provide increased durability of the suspension system 101 or its components for the use case in which the vehicle 100 is currently operating.

FIG. 7 provides an example of a data structure in the form of a look-up table that may be used in the determination of a vehicle 100 use case. In this example the use cases are split into 9 discrete use cases: A-I. Each use case is determined in dependence on the anti-roll torque and the disturbance characteristic. The look-up table may be stored in the memory 203 accessible by the control system 102.

In use cases in which disturbances are high, ride performance and system durability may be prioritised over handling performance. In low disturbance use cases handling performance may be prioritised over durability.

For example, in an "Enthusiastic on road" driving scenario D and a "Racetrack" driving scenario H, the control of the actuator 104 may ensure that the actuator 104 is capable of delivering appropriate responses to fast and/or large amplitude steering inputs. Such inputs may be made in order to make lane changes during highway driving, or as part of enthusiastic driving, such as taking a corner at speed on a race track. These use cases require a quick response to the anti-roll torque demand. In order to deliver the demanded anti-roll torque quickly a high motor speed is required. Therefore, in the on-road and track driving use cases A-D & H, the maximum motor speed is controlled to be towards the limit of the capabilities of the motor 104. For example the maximum motor speed may be controlled to be at least 80% of an absolute maximum motor speed, wherein the absolute maximum motor speed is the motor speed the motor 104 is rated to be able to deliver.

In use cases in which wheel inputs, and therefore disturbance control demands, are more prevalent, such as off-road driving use cases E-G, high motor speeds may lead to higher torque errors. Higher torque errors may lead to decreased ride characteristics. Higher torque errors may lead to increased loads in the components of the suspension system 101 and the vehicle 100 as a whole. Higher loads are undesirable as they may affect the durability of the components or systems. Therefore in these use cases lower maximum motor speeds may be preferable. For example the maximum motor speed may be controlled to be no more than 60% of the absolute maximum motor speed.

FIG. 8 provides an example of a data structure in the form of a look-up table comprising control parameters for the indices corresponding to those provided in FIG. 7. In this example the control parameter is the maximum motor speed. Each control parameter may have a corresponding data structure.

Figure 9:
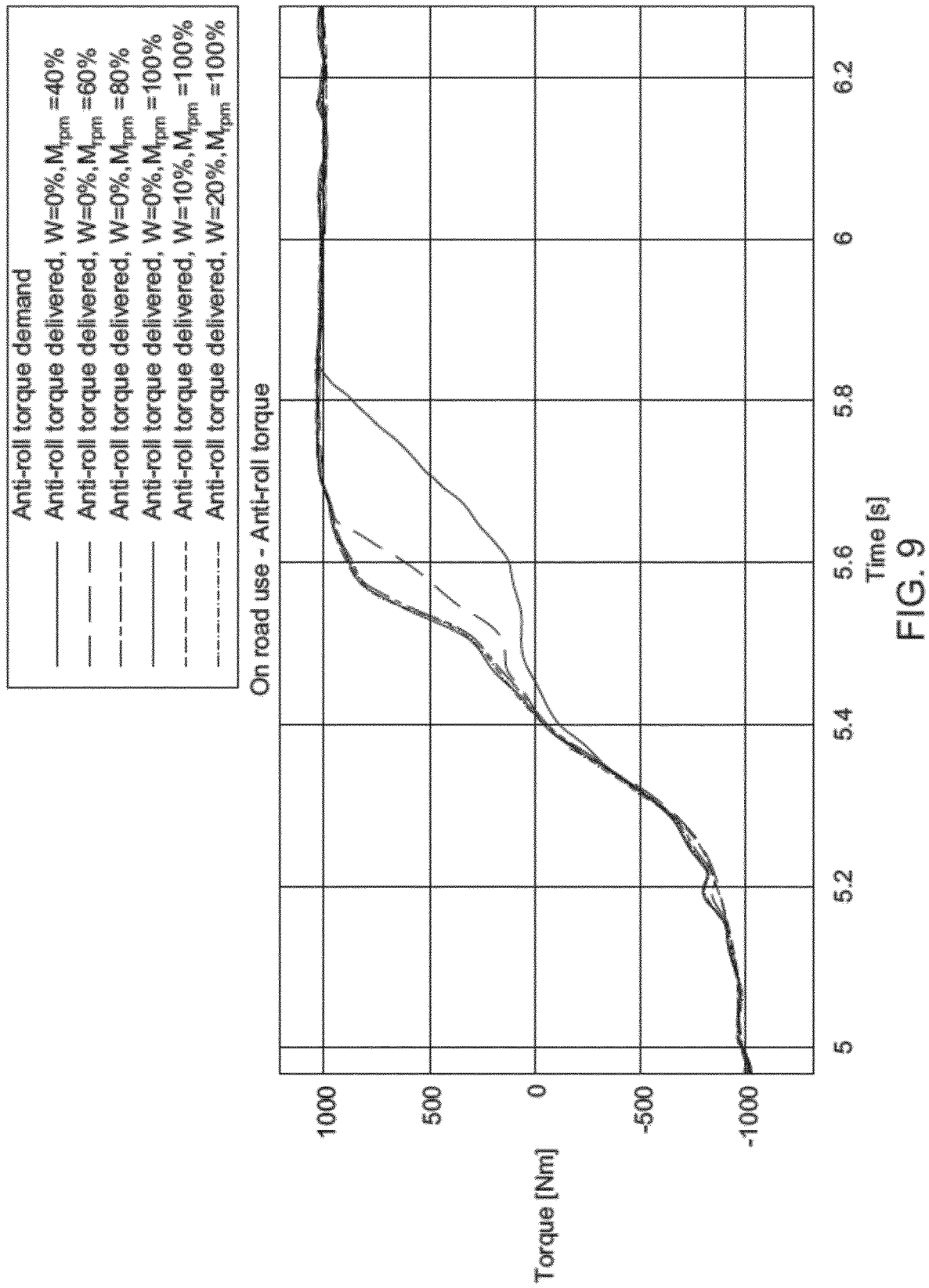
FIG. 9 shows a comparison of plots of anti-roll torque against time.

FIG. 9 shows a comparison of plots of anti-roll torque over time in response to a driving event on as smooth driving surface. The anti-roll torque demand as provided by the control system 102 is shown. Measurements of the delivered anti-roll torque for various control parameters are shown in the remaining plots. In this example the control parameters are the motor speed and the disturbance speed. The control parameters are modified through the application of an operating limit. The operating limit applied is a scaled value of the maximum output. In a first delivered torque plot the maximum motor speed $M_{rpm}$ has been scaled such that the operating limit is 40% of the maximum motor speed $M_{rpm}$ and the maximum disturbance response W has been scaled such that the operating limit is 0% of the disturbance speed. In a second delivered torque plot the maximum motor speed $M_{rpm}$ has been scaled such that the operating limit is 60% of the maximum motor speed $M_{rpm}$ and the maximum disturbance response W has been scaled such that the operating limit is 0% of the disturbance speed. In a third delivered torque plot the maximum motor speed $M_{rpm}$ has been scaled such that the operating limit is 80% of the maximum motor speed $M_{rpm}$ and the maximum disturbance response W has been scaled such that the operating limit is 0% of the disturbance speed. In a fourth delivered torque plot the maximum motor speed $M_{rpm}$ has been scaled such that the operating limit is 100% of the maximum motor speed $M_{rpm}$ and the maximum disturbance response W has been scaled such that the operating limit is 0% of the disturbance speed. In a fifth delivered torque plot the maximum motor speed $M_{rpm}$ has been scaled such that the operating limit is 100% of the maximum motor speed $M_{rpm}$ and the maximum disturbance response W has been scaled such that the operating limit is 10% of the disturbance speed. In a sixth delivered torque plot the maximum motor speed $M_{rpm}$ has been scaled such that the operating limit is 100% of the maximum motor speed $M_{rpm}$ and the maximum disturbance response W has been scaled such that the operating limit is 20% of the disturbance speed. From the plots it can be observed that scaling by a minimum of 80% provides the optimum response out of the modifications made. In this case the motor speed does not reach its predetermined maximum operating limit and as such there is no benefit derived from allowing 100% of the maximum motor speed. As the driving event takes place on a smooth road surface the scaling of the disturbance response W has little to no effect.

If the control system 102 was pre-set to modify the control parameter to fit an off-road use case then the response would fit the plot shown by the first and second delivered torque plots. FIG. 9 therefore clearly illustrates the advantage of the invention in being able to modify the response of the suspension system 101 in dependence on the current vehicle use case.

Figure 10:
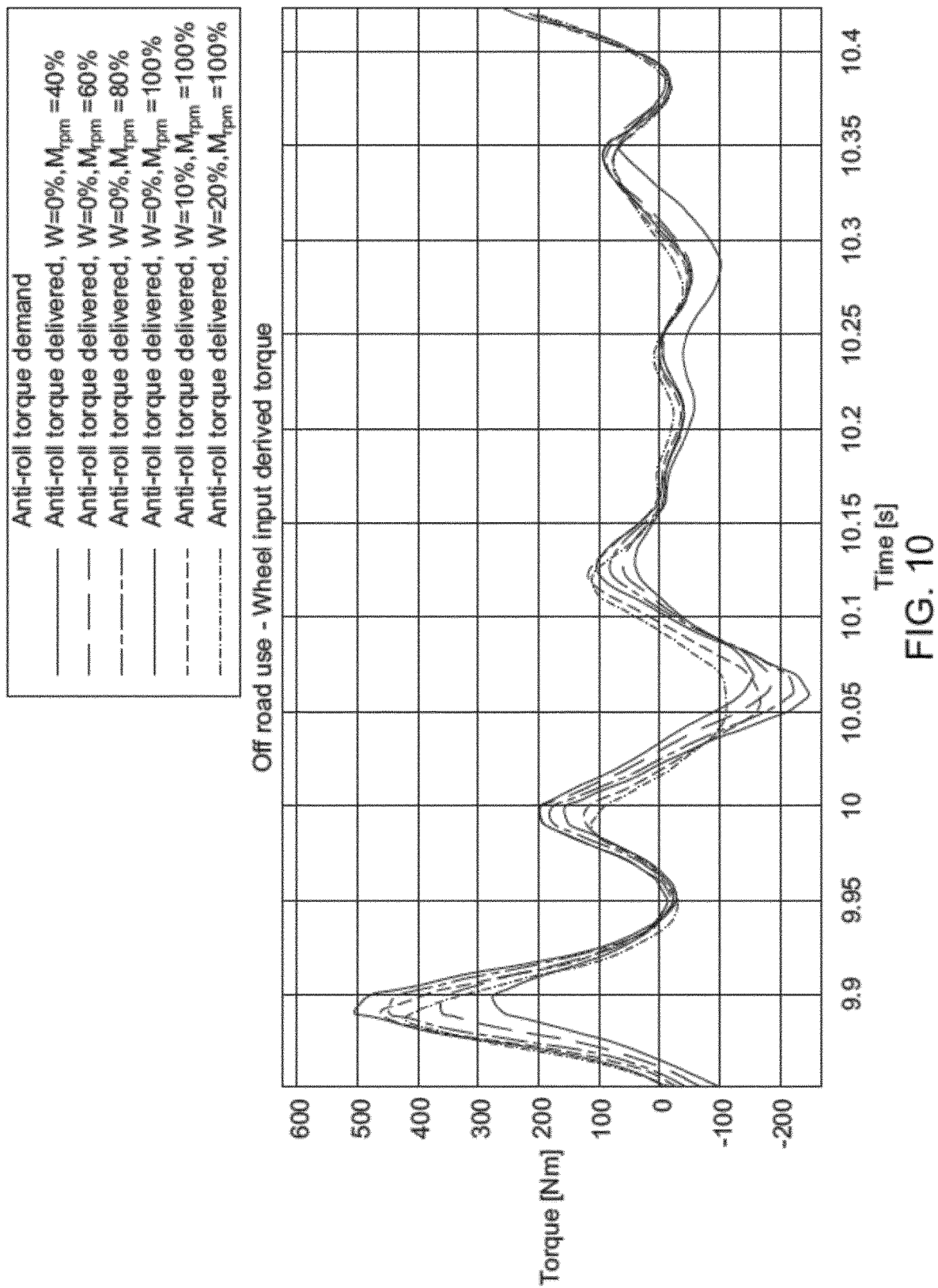
FIG. 10 shows a further comparison of plots of anti-roll torque against time.

FIG. 10 shows a comparison of plots of anti-roll torque over time in response to off road use. The anti-roll torque demand as provided by the control system 102 is shown. Measurements of the delivered anti-roll torque for various control parameters are shown in the remaining plots. In this example the control parameters are the motor speed and the disturbance speed. The control parameters are modified through the application of an operating limit. The operating limit applied is a scaled value of the maximum output. In a first delivered torque plot the maximum motor speed $M_{rpm}$ has been scaled such that the operating limit is 40% of the maximum motor speed $M_{rpm}$ and the maximum disturbance response W has been scaled such that the operating limit is 0% of the disturbance speed. In a second delivered torque plot the maximum motor speed $M_{rpm}$ has been scaled such that the operating limit is 60% of the maximum motor speed $M_{rpm}$ and the maximum disturbance response W has been scaled such that the operating limit is 0% of the disturbance speed. In a third delivered torque plot the maximum motor speed $M_{rpm}$ has been scaled such that the operating limit is 80% of the maximum motor speed $M_{rpm}$ and the maximum disturbance response W has been scaled such that the operating limit is 0% of the disturbance speed. In a fourth delivered torque plot the maximum motor speed $M_{rpm}$ has been scaled such that the operating limit is 100% of the maximum motor speed $M_{rpm}$ and the maximum disturbance response W has been scaled such that the operating limit is 0% of the disturbance speed. In a fifth delivered torque plot the maximum motor speed $M_{rpm}$ has been scaled such that the operating limit is 100% of the maximum motor speed $M_{rpm}$ and the maximum disturbance response W has been scaled such that the operating limit is 10% of the disturbance speed. In a sixth delivered torque plot the maximum motor speed $M_{rpm}$ has been scaled such that the operating limit is 100% of the maximum motor speed $M_{rpm}$ and the maximum disturbance response W has been scaled such that the operating limit is 20% of the disturbance speed. From the plots the degradation in the delivered torque can be observed as the operating limit of the maximum motor speed $M_{rpm}$ increases from 40% to 100%. Increasing the operating limit of the disturbance response W from 0% to 20% has the opposite effect in reversing the degradation. The effect of increasing the operating limit of the disturbance response W can be most clearly seen between 9.95 seconds and 10.05 seconds wherein the decreased difference between the peaks of the plots can be observed as the operating limit of the disturbance response W increases.

If the control system 102 was pre-set to modify the control parameter to fit an on-road use case then the response would fit the plots shown by the third and fourth delivered torque plots. FIG. 10 therefore clearly illustrates the advantage of the invention in being able to modify the response of the suspension system 101 in dependence on the current vehicle use case. It will be appreciated that various changes and modifications can be made to the present invention without departing from the scope of the present application.

The invention claimed is:

1. A control system for a vehicle suspension system, the control system comprising one or more controllers configured to:

receive at least one vehicle dynamics signal, wherein the at least one vehicle dynamics signal is indicative of a movement of one or more components of the vehicle suspension system;

determine a current dynamic usage of a vehicle in dependence on the received at least one vehicle dynamics signal, wherein determining the current dynamic usage of the vehicle comprises determining at least one vehicle usage index by determining an average movement value of the movement of the one or more components of the vehicle suspension system over a duration, the average movement value including an average of an anti-roll torque demand;

determine an operating limit for a control parameter of an actuator of the vehicle suspension system in dependence at least in part on the vehicle usage index; and output a control signal to control the actuator in dependence on the operating limit.

2. The control system according to claim 1, wherein the one or more controllers is configured to:

determine, in dependence on the at least one vehicle dynamics signal, at least one of:

the anti-roll torque demand, and a disturbance characteristic value; and determine the current dynamic usage of the vehicle at least in part in dependence on the anti-roll torque demand and/or the disturbance characteristic value.

3. The control system according to claim 1, wherein determining the current dynamic usage of the vehicle comprises selecting one of a plurality of predetermined dynamic use cases.

4. The control system according to claim 1, wherein determining the current dynamic usage of the vehicle comprises comparing the at least one vehicle usage index to a plurality of previously determined vehicle usage indices.

5. The control system according to claim 1, wherein the control parameter comprises at least one of: a disturbance characteristic, a motor speed, a consumption current, a motor torque and a regeneration current.

6. The control system according to claim 1, wherein determining the operating limit comprises:

determining at least one scaling factor; and applying the at least one scaling factor to a predetermined operating limit of the control parameter of the actuator.

7. The control system according to claim 1, wherein the determined current dynamic usage comprises an on-road use case or an off-road use case and wherein the determined operating limit is higher for the on-road use case than for the off-road use case.

8. The vehicle suspension system comprising at least one roll stabilizer, the actuator and the control system according to claim 1.

9. The vehicle comprising the control system according to claim 1.

10. The control system according to claim 1, wherein the anti-roll torque demand is at each of front and rear axles of the vehicle.

11. The control system according to claim 1, wherein the average movement value further includes an average velocity difference between left and right wheels of the vehicle.

12. A method of controlling a vehicle suspension system, the method comprising:

receiving at least one vehicle dynamics signal, wherein the at least one vehicle dynamics signal is indicative of a movement of one or more components of the vehicle suspension system determining a current dynamic usage of a vehicle in dependence on at least one vehicle dynamics parameter, wherein determining the current dynamic usage of the vehicle comprises determining at least one vehicle usage index by determining an average movement value of the movement of the one or more components of the vehicle suspension system over a duration, the average movement value including an average of an anti-roll torque demand;

determining an operating limit for a control parameter of an actuator of the vehicle suspension system in dependence at least in part on the current dynamic usage of the vehicle; and controlling the actuator in dependence on the operating limit.

13. A non-transitory computer readable medium comprising computer readable instructions that, when executed by a processor, cause the processor to perform the method of claim 12.

* * * * *